May 20, 1941. T. F. BRACKETT 2,242,506
PHOTO-CELL CONTROL FOR DIE SINKING MACHINES
Filed July 31, 1937 14 Sheets-Sheet 4

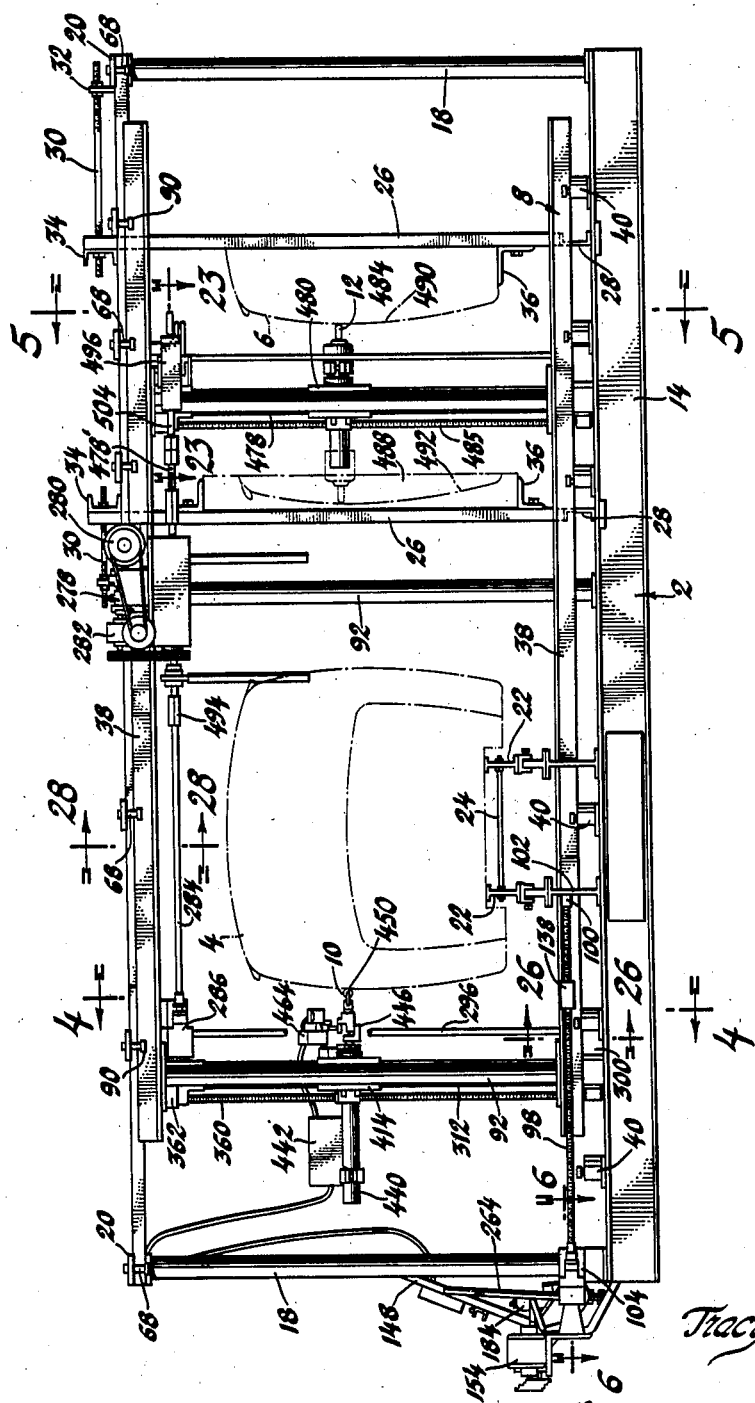

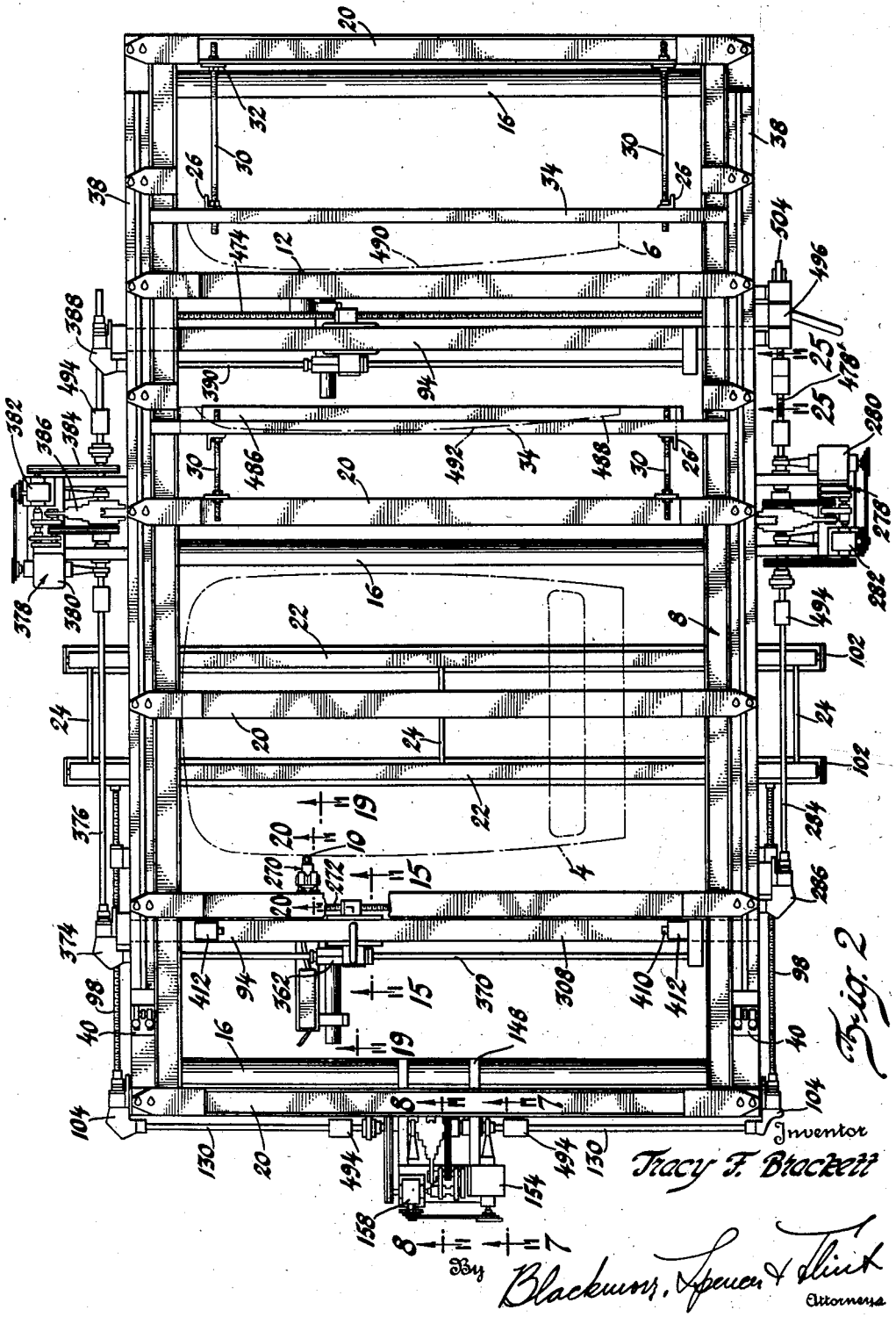

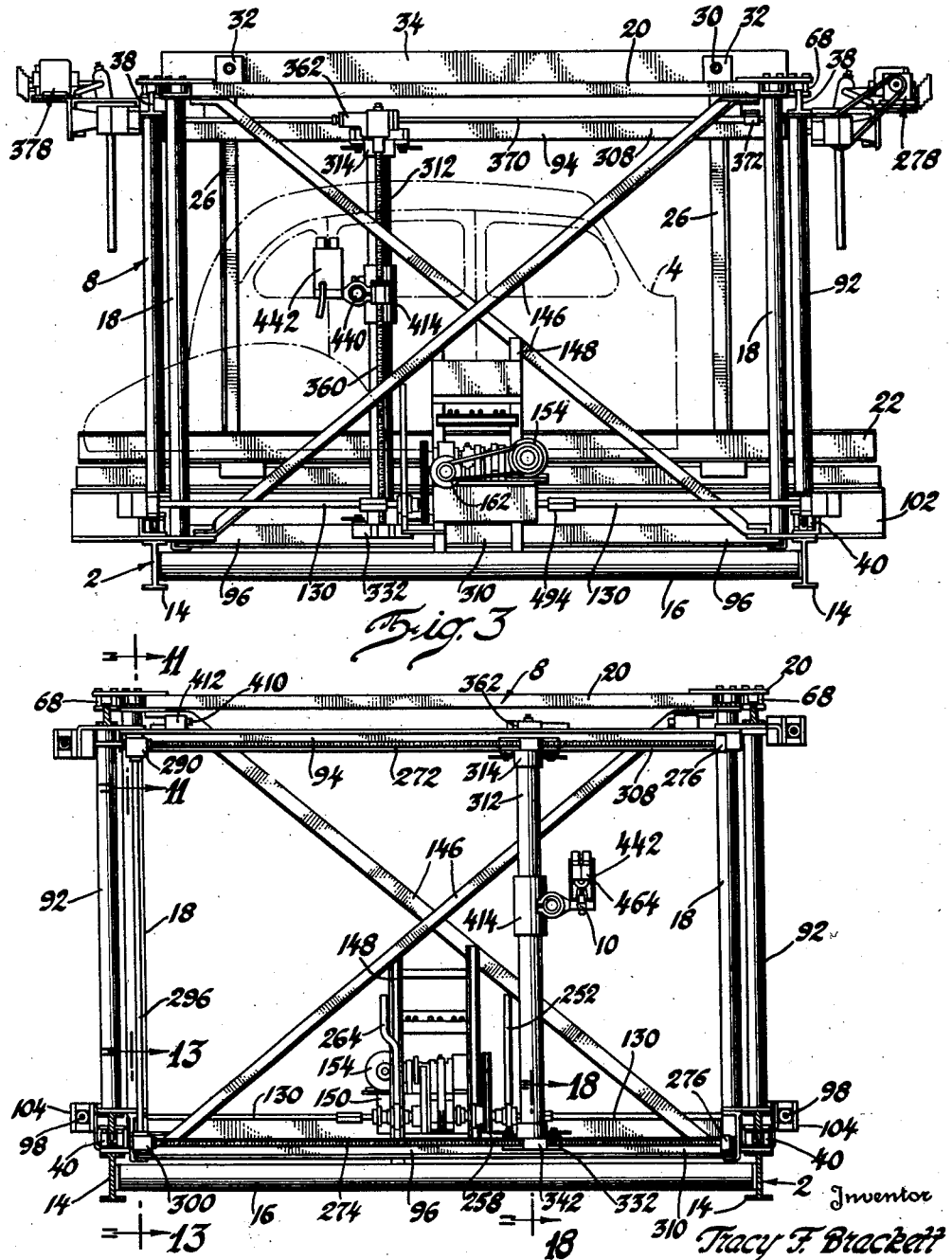

Inventor
Tracy F. Brackett
By Blackmore, Spencer & Flint
Attorneys

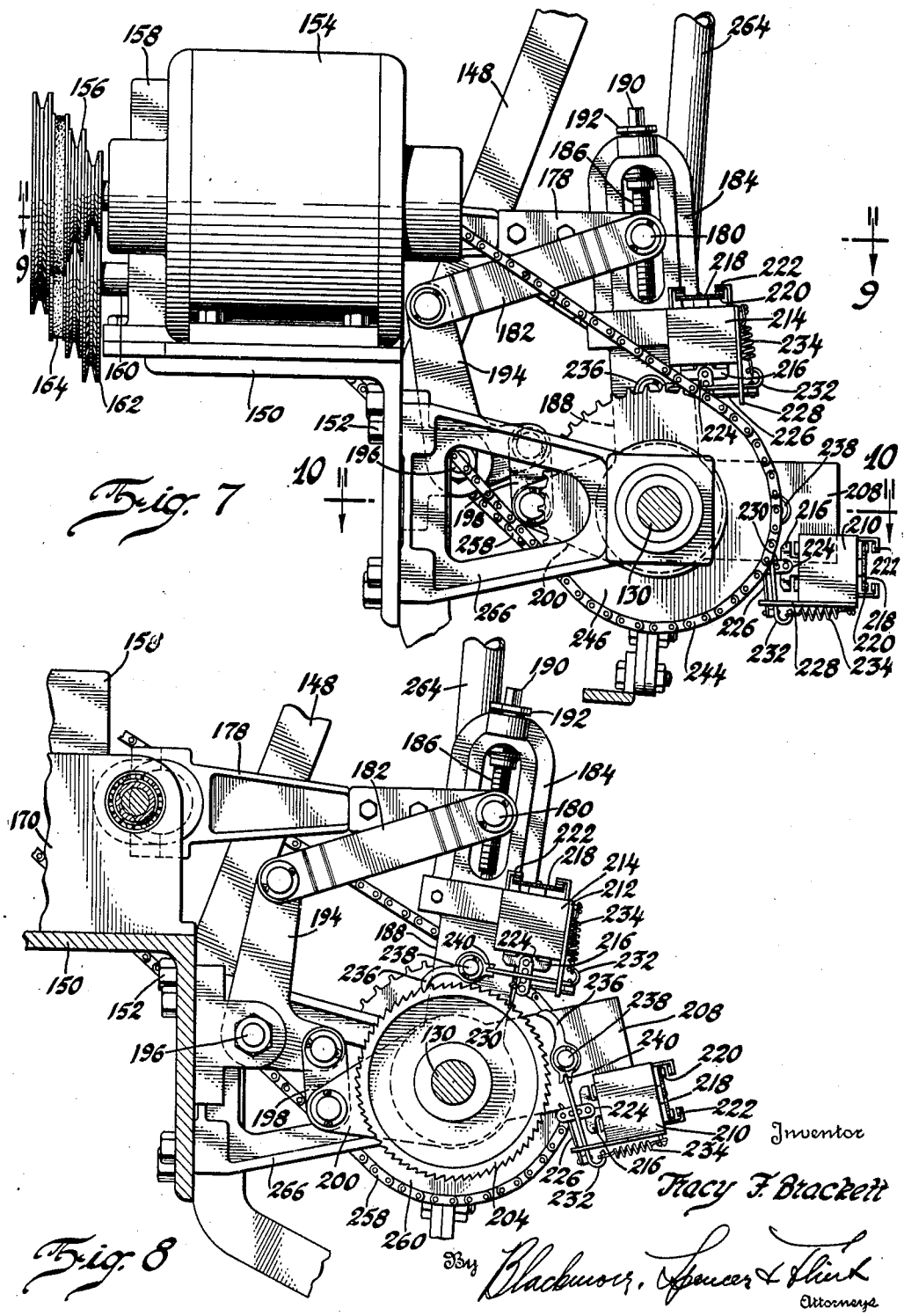

Inventor
Tracy F. Brackett

May 20, 1941. T. F. BRACKETT 2,242,506
PHOTO-CELL CONTROL FOR DIE SINKING MACHINES
Filed July 31, 1937 14 Sheets-Sheet 7

Inventor
Tracy F. Brackett
By Blackmore, Spencer & Flint
Attorneys

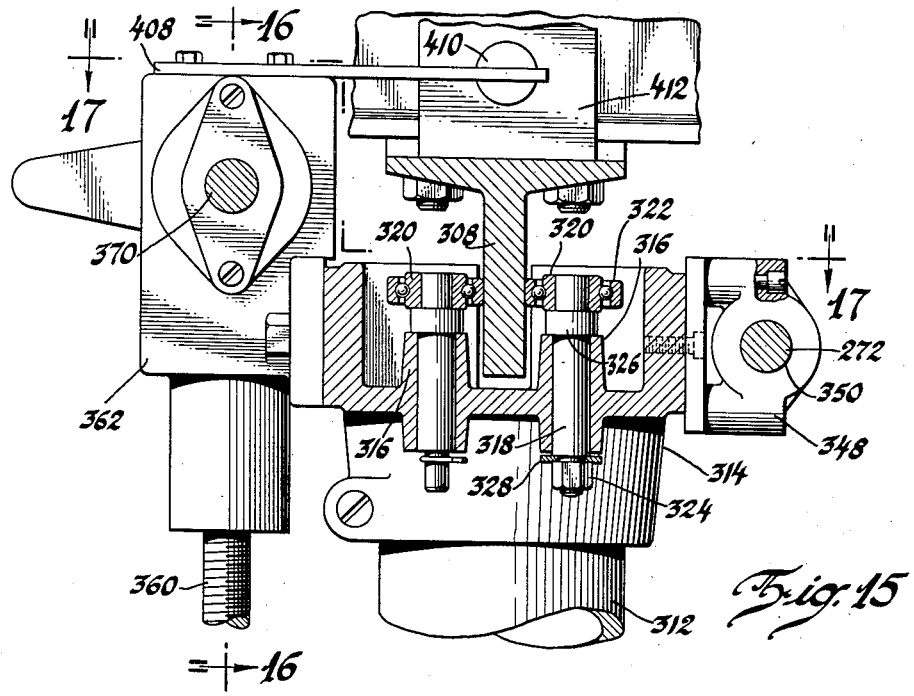
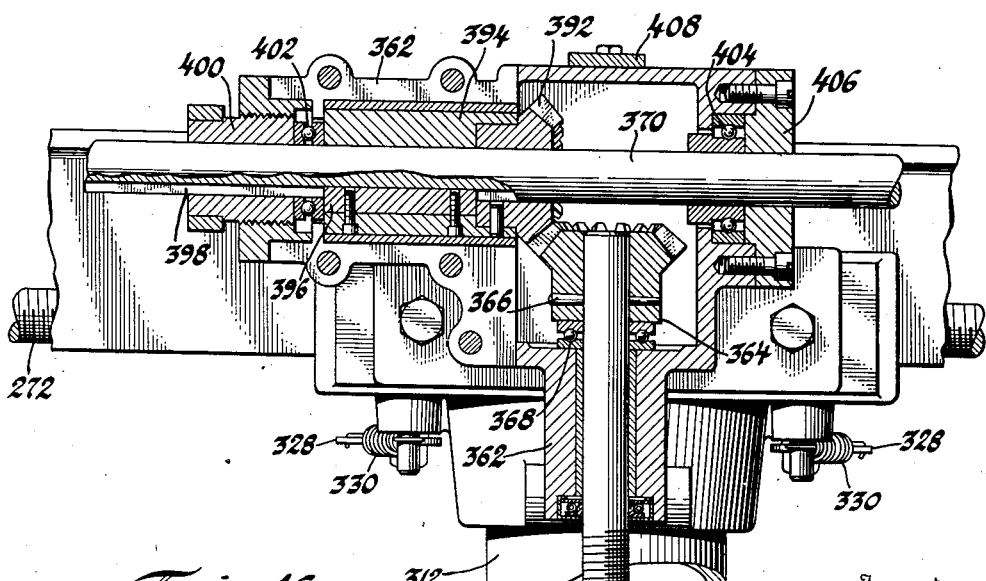

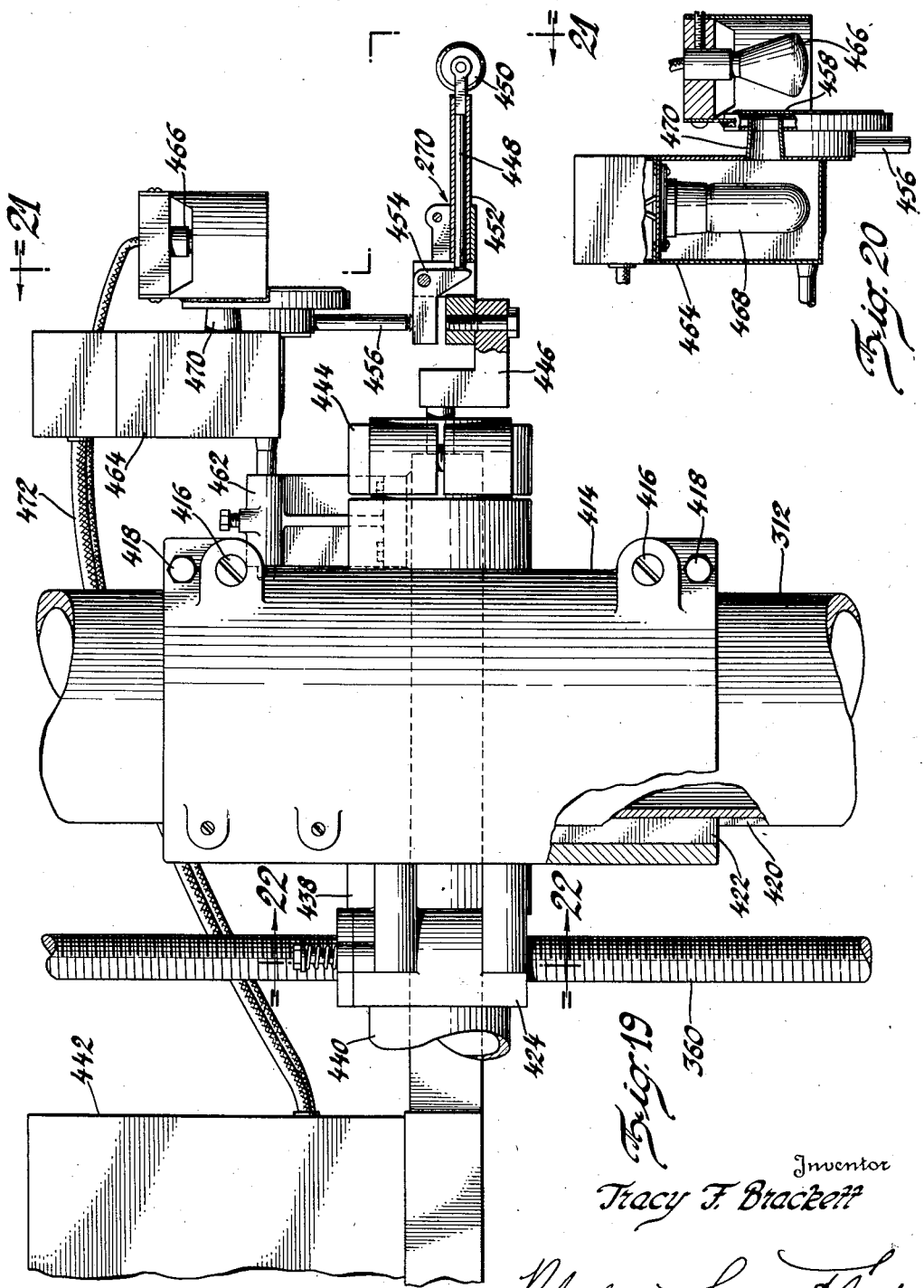

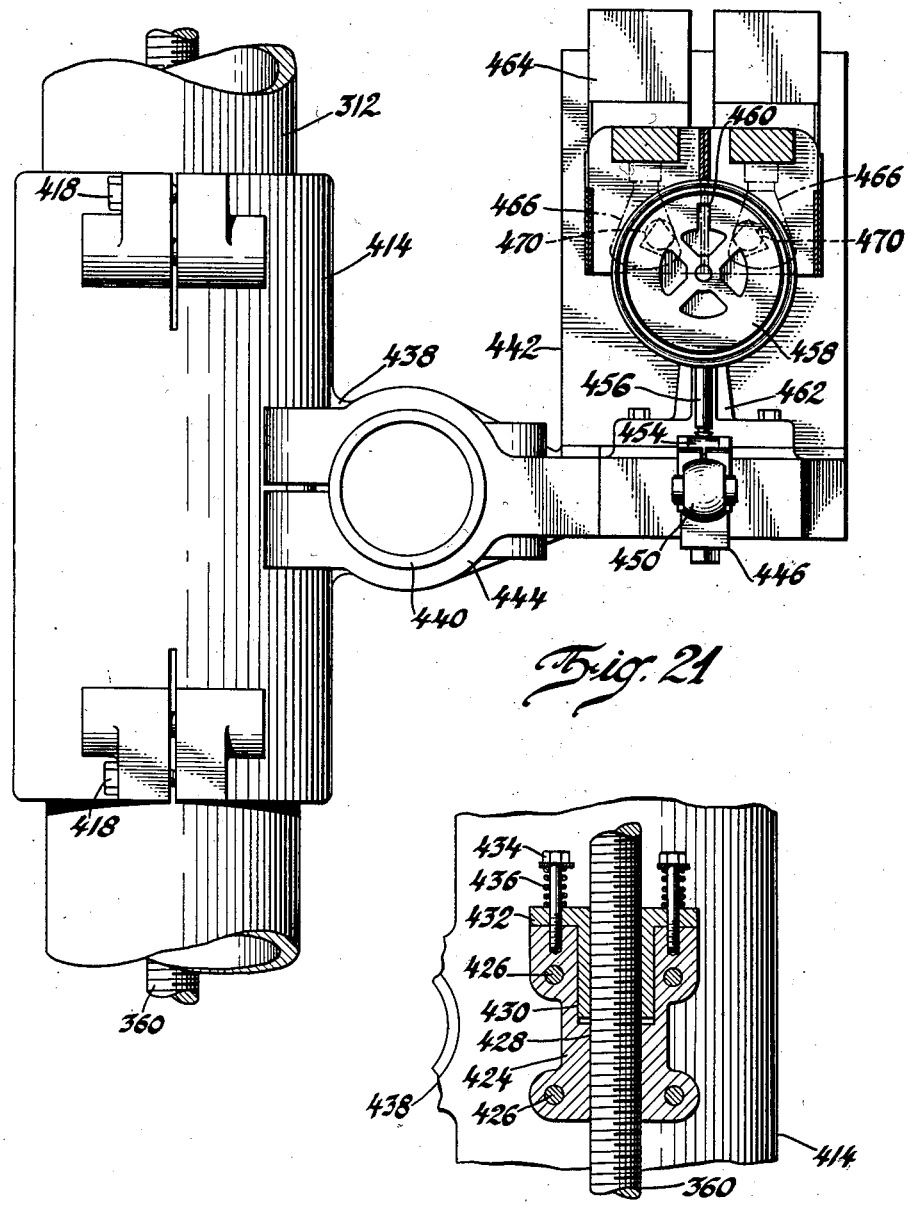

May 20, 1941.     T. F. BRACKETT     2,242,506
PHOTO-CELL CONTROL FOR DIE SINKING MACHINES
Filed July 31, 1937     14 Sheets-Sheet 13
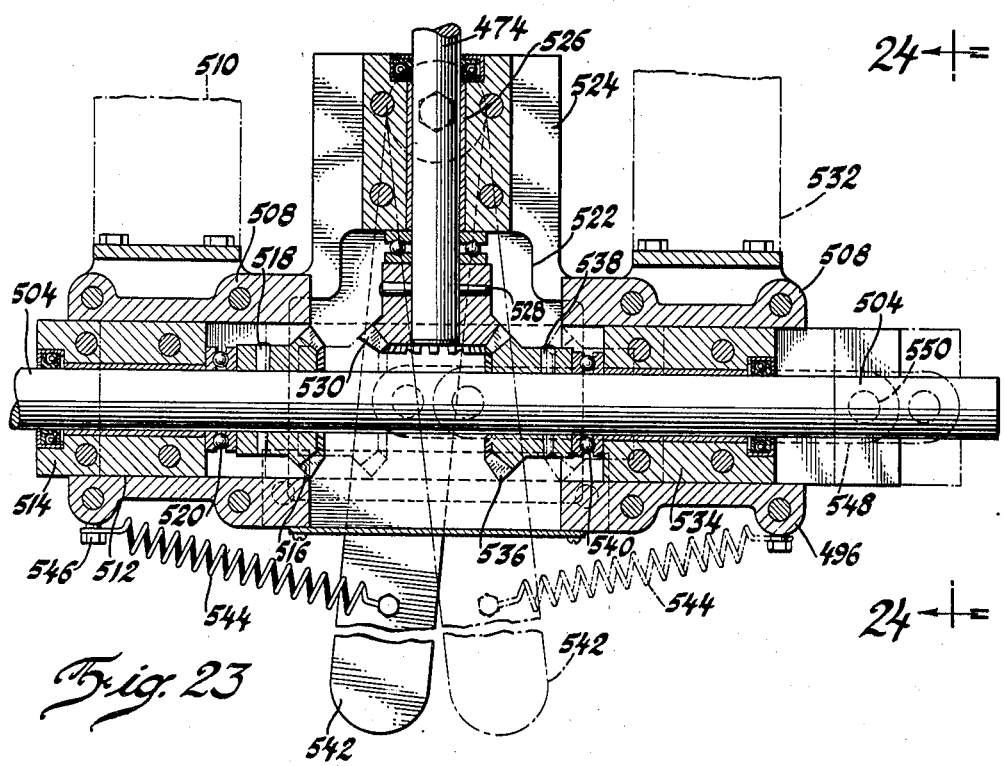
Fig. 23
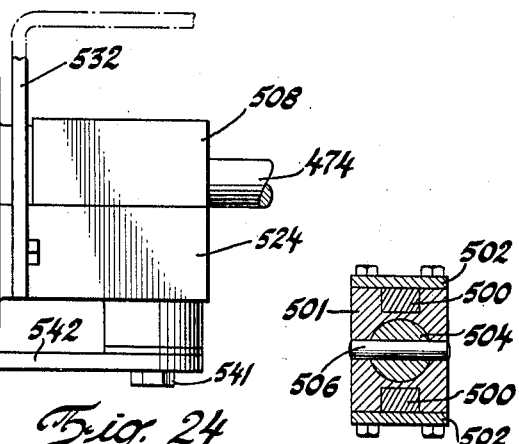
Fig. 24
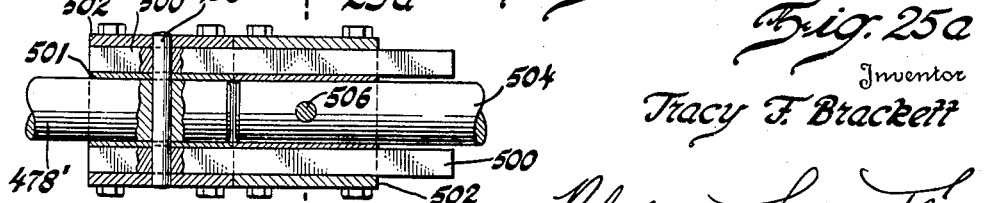
Fig. 25
Fig. 25a
Inventor
Tracy F. Brackett
By Blackmore, Spencer & Flint
Attorneys May 20, 1941.  T. F. BRACKETT  2,242,506
PHOTO-CELL CONTROL FOR DIE SINKING MACHINES
Filed July 31, 1937   14 Sheets-Sheet 14
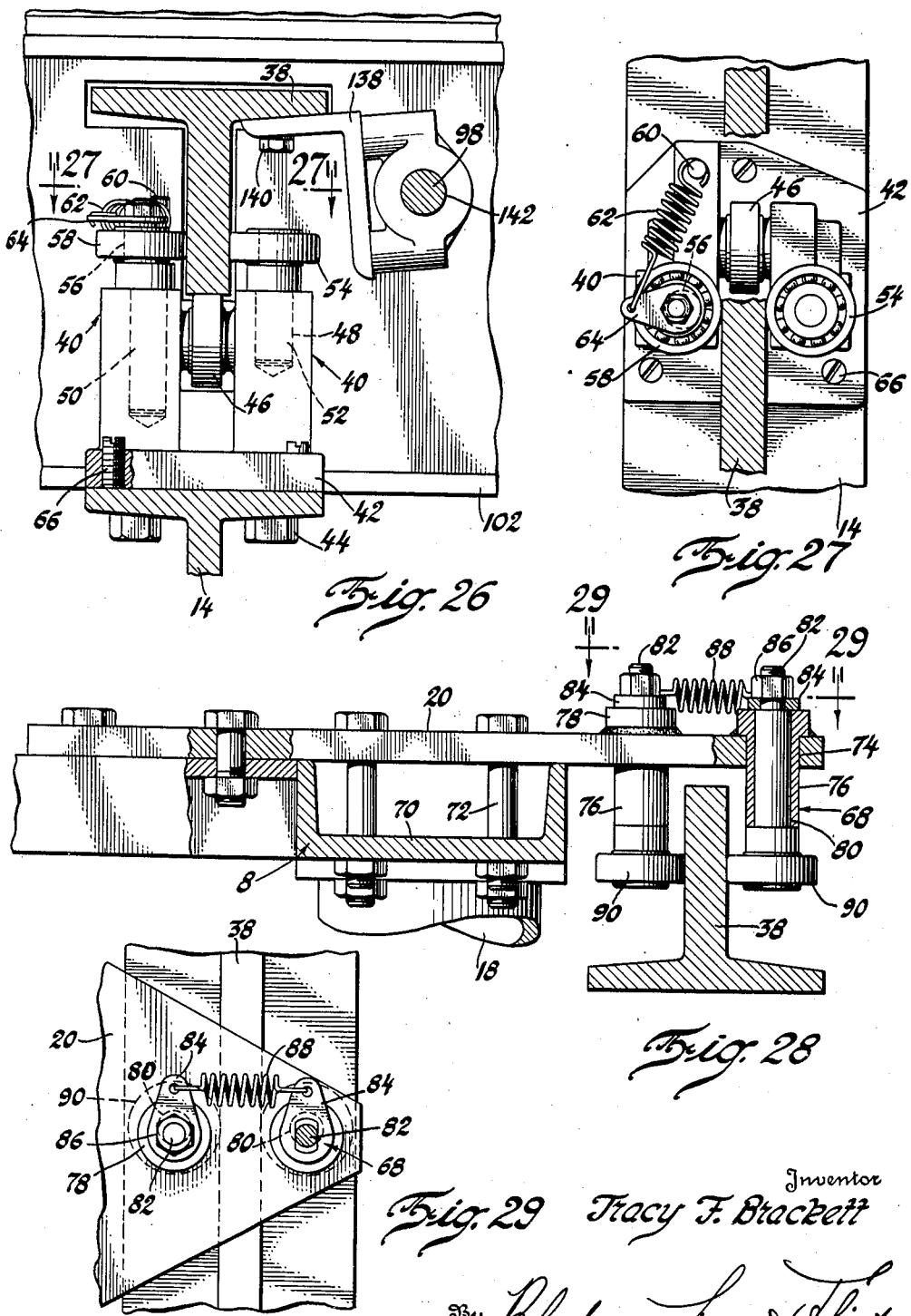

Patented May 20, 1941

2,242,506

UNITED STATES PATENT OFFICE 2,242,506

PHOTO-CELL CONTROL FOR DIE SINKING MACHINES

Tracy F. Brackett, Detroit, Mich., assignor to General Motors Corporation, Detroit, Mich., a corporation of Delaware Application July 31, 1937, Serial No. 156,644

9 Claims. (Cl. 90—13.5)

This invention relates to contouring apparatus and more specifically to means for reproducing a given surface by controlling a movable cutting means from other means following a templet or model.

While my invention has numerous applications where surface reproduction is desired, it will here be specifically shown and described as applied to means for sinking or making dies for illustration only and it is to be understood that my invention should not be so limited.

In the particular application of die sinking, it it has long been a problem to provide apparatus that will accurately and swiftly reproduce a die from a model surface. This problem has increased greatly as the size of the dies used has increased, for now in the automobile industry, for example, whole portions of a car body are stamped from one die. The production of such dies is a long and arduous process and much has to be done by hand.

It is therefore the object of my invention to provide a device for accurately reproducing a given surface so that only a small amount of smoothing is necessary.

It is a further object of my invention to provide a duplicating device in which high cutting speeds are attainable to cut down the length of time heretofore necessary to reproduce a surface.

It is a further object of my invention to provide a duplicating device which may by simple adjustments produce either a similar surface to that of the model or a complementary surface thereto.

It is a still further object to provide such a machine as is substantially automatic in its operation.

With the above and other objects in view, the embodiments of my invention are disclosed in the following specification and claims and illustrated in the accompanying drawings, in which:

Figure 1 is the front elevation of a device for reproducing surfaces according to my invention.

Figure 2 is a top plan view of the apparatus.

Figure 3 is an end elevation of the apparatus.

Figure 4 is a vertical sectional view taken on line 4—4 of Figure 1.

Figure 7 is an enlarged detail view of one of the drive units taken on line 7—7 of Figure 2 and looking in the direction of the arrows.

Figure 8 is an enlarged sectional view taken on line 8—8 of Figure 2.

Figure 15 is an enlarged sectional view taken on line 15—15 of Figure 2.

Figure 16 is a sectional view of a portion of the device taken on line 16—16 of Figure 15.

Figure 19 is an enlarged view of the control head, parts being shown in section, taken substantially on line 19—19 of Figure 2.

Figure 20 is an enlarged sectional view taken on line 20—20 of Figure 2.

Figure 21 is a sectional view taken on line 21—21 of Figure 19.

Figure 22 is a sectional view taken on line 22—22 of Figure 19.

Figure 23 is an enlarged sectional detail of the drive control taken on line 23—23 of Figure 1.

Figure 24 is a sectional view taken on line 24—24 of Figure 23.

Figure 25 is an enlarged sectional detail of a connection taken on line 25—25 of Figure 2.

Figure 25a is a sectional view taken on line 25a—25a of Figure 25.

Figure 26 is an enlarged sectional detail of the runway taken on line 26—26 of Figure 1.

Figure 27 is a detail section taken on line 27—27 of Figure 26.

Figure 28 is an enlarged sectional detail of the upper runway taken on line 28—28 of Figure 1.

Figure 29 is a sectional view taken on line 29—29 of Figure 28.

Figure 5:
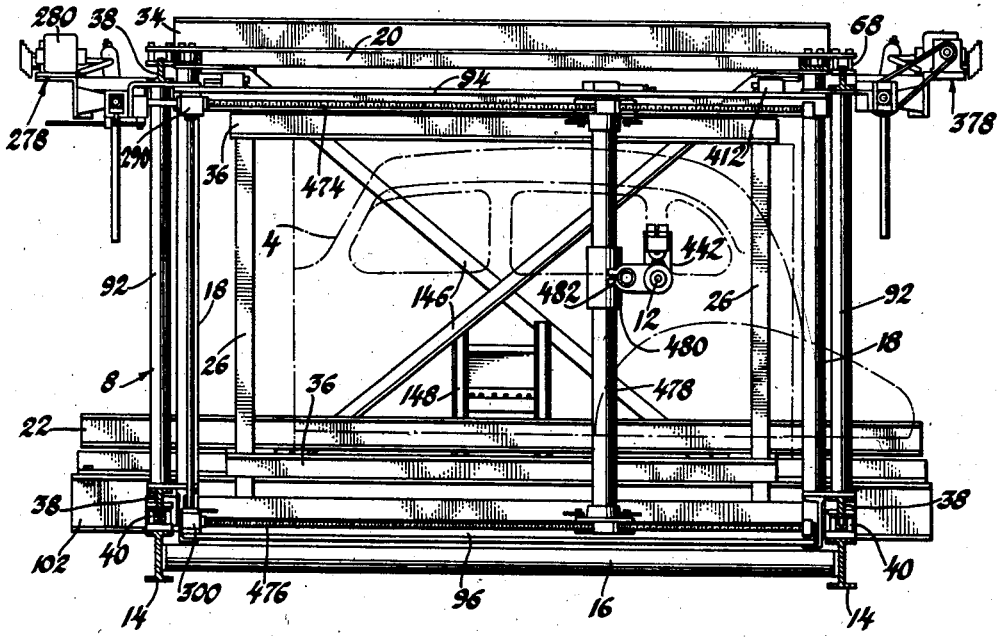
Figure 5 is a vertical sectional view taken on line 5—5 of Figure 1.

The embodiments of my invention shown herein may be generally described as including a stationary frame 2 roughly of rectangular box form which supports a model or templet 4 and a work piece or die 6. Also carried on the frame 2 is a relatively movable frame 8 which carries a tracing arm or pointer 10 and the other end of the frame 8 carries a cutter or router 12. The tracer is mounted adjacent the model surface and is adapted to be driven transversely or vertically over the surface by a suitable drive later to be described. As it follows the surface it is designed to move inwardly and outwardly with the contour of the model surface and in order to do so causes the movable frame 8 to move in a direction transverse to the surface of the model. This movement of the frame 8 of course carries with it the router or cutter 12 which is in juxtaposition to the work piece or die 6 and therefore causes the cutter to reproduce the surface of the model on the work piece.

The frame 2 is constructed of two parallel spaced I beams 14 to which are bolted a plurality of cross members 16. Also bolted to each of the I beams are a plurality of spaced vertical posts 18 which carry suitable longitudinal and transverse members 20 completing the stationary box frame and which support suitable apparatus later to be described.

On one side of the frame are supported a pair of transverse rails 22 secured together by spacing rods 24 and bolted to the frame 2. The purpose of these rails is to support a model such as 4 shown in dotted outline. Supported in the opposite end of the frame are work supporting panels 26, the lower edges of which are bolted at the extremities to the I beams as shown at 28. The tops of the panels are secured to the top of the frame by pairs of long double threaded rods 30 which pass through brackets 32 on the frame and brackets 34 on the panels and have opposed pairs of nuts to secure them at each end. The position of the upper end of the panels may be varied by varying the length of the rods. Any major change in position will of course necessitate the removal of the lower brackets 28 to a different set of holes in the I beams. Therefore these panels may be supported at any desired position for the cutting process.

It should here be pointed out that the panels are on opposite sides of the cutter or router so that it will cut either the inner or the outer surface as desired. Clamps such as 36 are provided on each panel to support the work piece thereon.

Within the stationary frame is a movable frame 8 which moves longitudinally therein. It is formed of a plurality of long parallel members 38 lying adjacent the longitudinal girders of the stationary frame. These members 38 have a T-shaped cross section and the lower ones on each side are supported on the stationary girders by a plurality of bearings designated generally at 40 and best shown in detail in Figures 26 and 27. These bearings are formed of a block 42 secured to the upper surface of the girder by bolts 44. This block consists roughly of two substantially cylindrical vertical portions extending upwardly from a base and a boss on one side of each, said bosses carrying a roller 46 adapted to contact the lower edge of the T beam to support the same in rolling contact. In each of the vertical cylindrical portions there is a drilled opening 48 into which extends a stub shaft 50—52. On the stub shaft 52 is mounted a roller bearing assembly 54, the outer race surface of which contacts the side of the T beam to guide the same. The other stub shaft 50 has an offset end portion 56 upon which is rotatably mounted an outer ring and ball bearing assembly 58 adapted to bear against the other side of the vertical section of the T beam.

A pin 60 projects upwardly from the base of the block and has secured thereto one end of a spring 62 the opposite end of which is secured to one end of an arm 64 rigidly attached to the eccentric end of the shaft 56 out of contact with any rotatable means. The spring thus biases the roller against the side of the T beam and tends to keep the vertical section tightly between the two rollers and upon the roller 46. There are a plurality of these assemblies on each side of the stationary frame to support the lower edge of the movable frame. There are also provided set screws 66 in each block base to project against the upper surface of the I beam to allow leveling of the block for smooth running.

The upper longitudinal girders 38 of the movable frame are slidably supported in a similar manner. There are provided on the upper stationary structure a plurality of roller assemblies designated generally at 68 and which are best shown in detail on Figures 28 and 29. The upper longitudinal frame member 70 has secured thereto by suitable bolts 72 the various cross members 20, the ends of the cross members extending out beyond the longitudinal members.

In the overhanging ends of the cross members 20 there are provided a pair of spaced openings 74 through which extend sleeves 76 having an enlarged boss 78 at the top which prevents the sleeve from passing entirely through the opening. Extending through the sleeves 76 are concentric bores 80 in which are carried the stub shafts 82 to the lower extremities of which are eccentrically secured roller bearing assemblies 90 similar to those previously described and adapted to run against the opposite sides of the vertical portion of the upper T frame 38 which in this case is inverted as shown.

To the upper end of each shaft is applied a lever arm 84 secured thereto by a nut 86. The two opposed arms 84 are adjusted to lie parallel and between their outer extremities extends a spring 88 which tends to rotate the two eccentric sleeve assemblies toward each other and so forces the rollers on the lower extremities against the opposite faces of the frame member 38. The adjustment of spring tension or the force with which the rollers bear against the frame may be adjusted by loosening the nuts 86 and changing the relative angular position of the arm 84 with respect to the sleeve.

Extending between the upper and lower longitudinal frame members 38 are a series of vertical posts 92 similar to those on the stationary frame and there are also provided upper and lower cross frame members 94 and 96 which when completed form a second rectangular box frame within the first and which is easily movable longitudinally on rollers.

Figure 6:
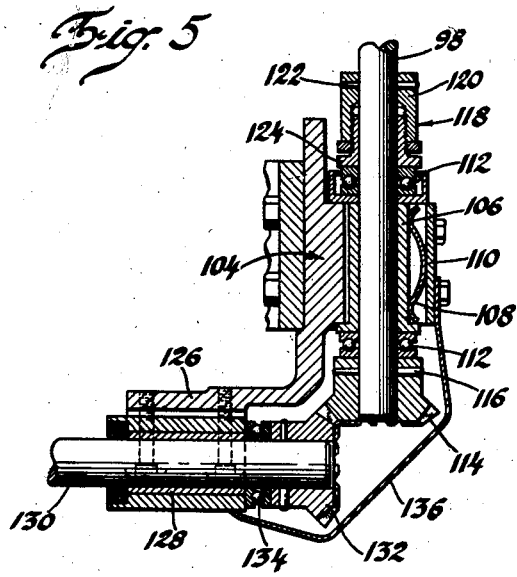
Figure 6 is an enlarged sectional detail of the shaft drive taken on line 6—6 of Figure 1.

The apparatus thus far described has now set forth a movable box frame within a larger stationary box frame. The driving means for moving the movable frame will now be described. Referring specifically to Figure 1, a long threaded rod 98 may be seen in the lower left hand portion which lies parallel to the lower longitudinal frame members. One end of the rod is journalled at 100 in one of the lower transverse rails 102 which supports the rails 22 for holding the model. The opposite end of the rod is supported in a bracket 104 secured to the stationary frame adjacent the lower end of the post 18. This support and drive connection is best shown on Figure 6.

The bracket 104 supports on one side a stationary sleeve bearing 106, said bearing being spring-clamped in proper position by a curved leaf spring 108 and cap 110. The purpose of the spring 108 is to remove any backlash in the adjacent gear connection between the two beveled gears which will later be described. Adjacent the two ends of the sleeve bearing are supported two ball bearing assemblies 112. On the end of the rod 98 is rigidly supported a bevel gear 114 by a pin 116. This gear bears against one side of the adjacent ball race and the other side of the race bears against one end of the sleeve bearing. Upon the rod adjacent the other ball bearing is a tapered telescoping clamping member 118, one portion 120 of which is rigidly pinned to the rod by pin 122 and the inner portion 124 threadedly engages the outer and may be adjustably positioned to clamp the ball race firmly.

The bracket 104 has a portion 126 extending at right angles thereto which supports a sleeve bearing 128 for one end of a shaft 130. The end of shaft 130 carries a bevel gear 132 which meshes with the bevel gear 114 and in a similar manner to that already described there is a ball bearing assembly 134 clamped between the sleeve bearing and the bevel gear. A protective casing 136 is provided to cover the pair of gears. The shaft 130 extends to driving apparatus later to be described. Thus as shaft 130 rotates it drives the threaded rod 98.

Referring now again to Figure 26, there may be seen a bracket 138 which is rigidly secured to the lower longitudinal T beam of the movable frame by bolt 140. This bracket has a threaded opening 142 therethrough through which extends the threaded rod 98. Thus as the rod rotates and is driven by shaft 130, the bracket will be forced along the rod and the frame will move. In a machine of this size a drive on one side is not sufficient so a duplicate construction has been utilized on the back of the machine as shown in Figure 1 so that both sides are driven at the same time to prevent binding. The rear threaded rod 98 is driven by the other end of shaft 130 which extends across the end of the machine.

Secured in the end of the stationary frame nearest the model are two diagonal members 146 forming an X and to which are secured a pair of spaced substantially vertical support members 148, the lower edges of which are secured to the cross frame member 16. These members 148 are slightly bowed outwardly and carry bolted to their intermediate section an angle shelf bracket 150 by bolts 152 (see Figures 7 and 8).

Supported upon the shelf and upon the vertical supports is driving apparatus that is designed to drive the shaft 130 in either direction, depending upon the needs of the model for reproduction either by small increments or at a relatively fast pace. A source of power 154 is shown as being an electric motor having on its shaft a multiple groove pulley 156, the various grooves being of different diametral sizes. Mounted on the opposite end of the shelf is a worm gear reduction box 158, the driven shaft 160 of which has a multiple diameter pulley 162. A belt 164 interconnects the two pulleys 162 and 156 by changing the relative pulley diameters; by moving the belt from one set of grooves to the other, the speed of drive may be varied.

Figure 9:
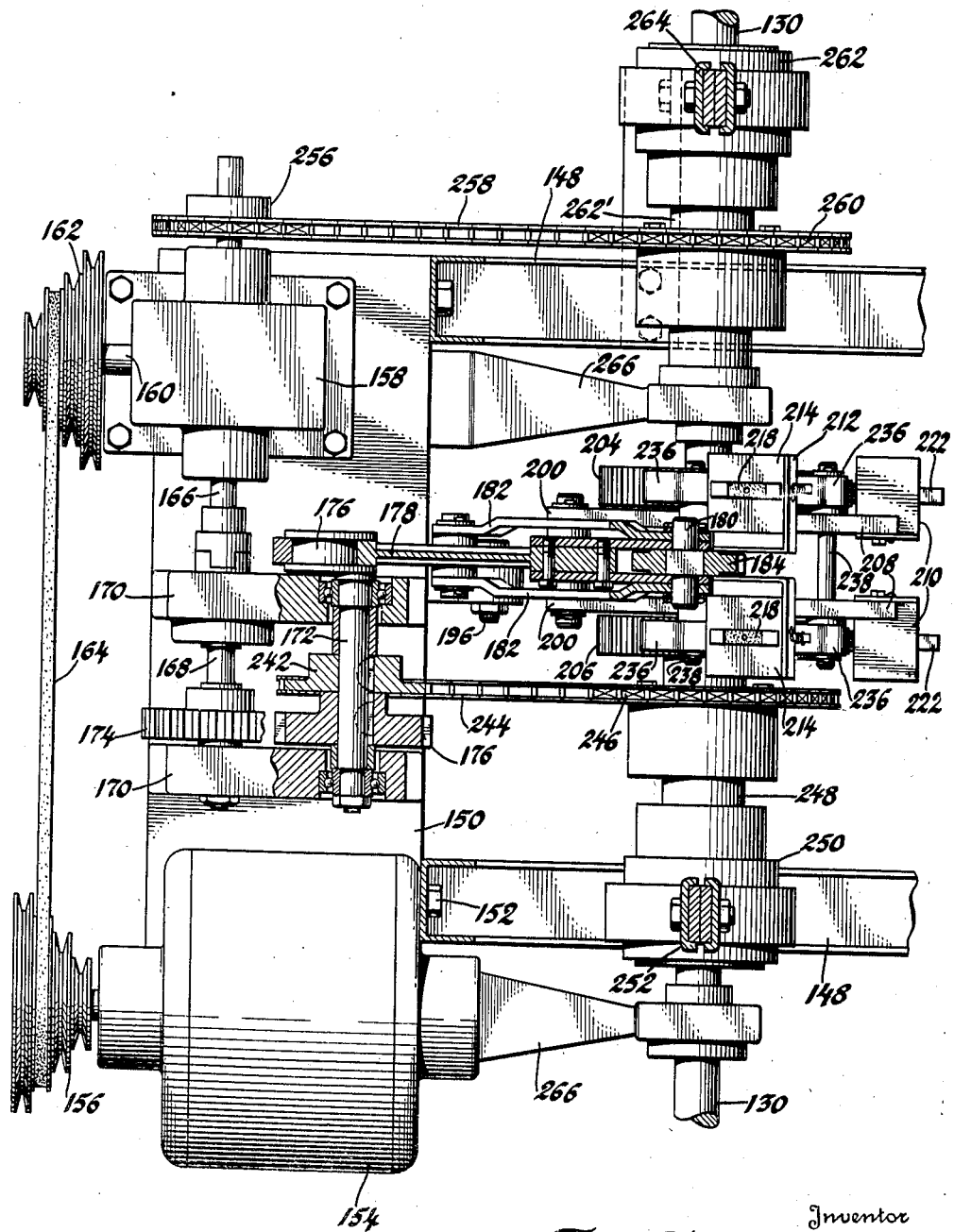
Figure 9 is an enlarged top plan view partly in section of one of the drive units taken partly on line 9—9 of Figure 7.

The driven shaft 166 of the gear reduction box 158 drives a stub shaft 168 in alignment therewith which is supported on journals 170 which extend upwardly from the upper surface of the shelf. Also journalled in the supports 170 is a parallel stub shaft 172 which is driven from the stub shaft 168 by intermeshing of gears 174 and 176 secured to the two shafts 168 and 172 respectively. One end of the shaft 172 projects beyond the uppermost journal 170, as viewed in Figure 9, and has secured thereto an eccentric portion 176 which acts as a crank for a connecting rod arm 178. This arm 178 is pivotally connected to a pin 180 which also supports a pivotal link 182, said pin being adjustably supported in an elliptical shaped housing 184 through which an adjusting screw 186 extends for moving the pin 180 up or down. The housing 184 is supported on the upper end of a member 188 which is pivotally supported on the shaft 130 in a manner which will later be described more in detail.

It may thus be seen that as the eccentric portion 176 rotates it will force the arm 178 back and forth which will cause the housing 184 to reciprocate through an arc the length of which depends upon the position of the adjusting screw 186 vertically. The adjusting screw 186 extends through the upper threaded portion of the member 184 and has a squared end 190 projecting for adjustment purposes and also a locking concentric surrounding nut 192 for locking the screw in position once it has been properly adjusted. The links 182, which as beforementioned are freely pivoted on the pin 180, have their opposite ends pivotally connected to the long arm 194 of a bell crank lever which is pivoted on the frame of the shelf at a point 196. The short arm of the bell crank is connected to a short pair of links 198, the opposite end of which is connected to a plurality of spaced members 200 also rotatable on and relative to the shaft 30.

Figures 10, 30:
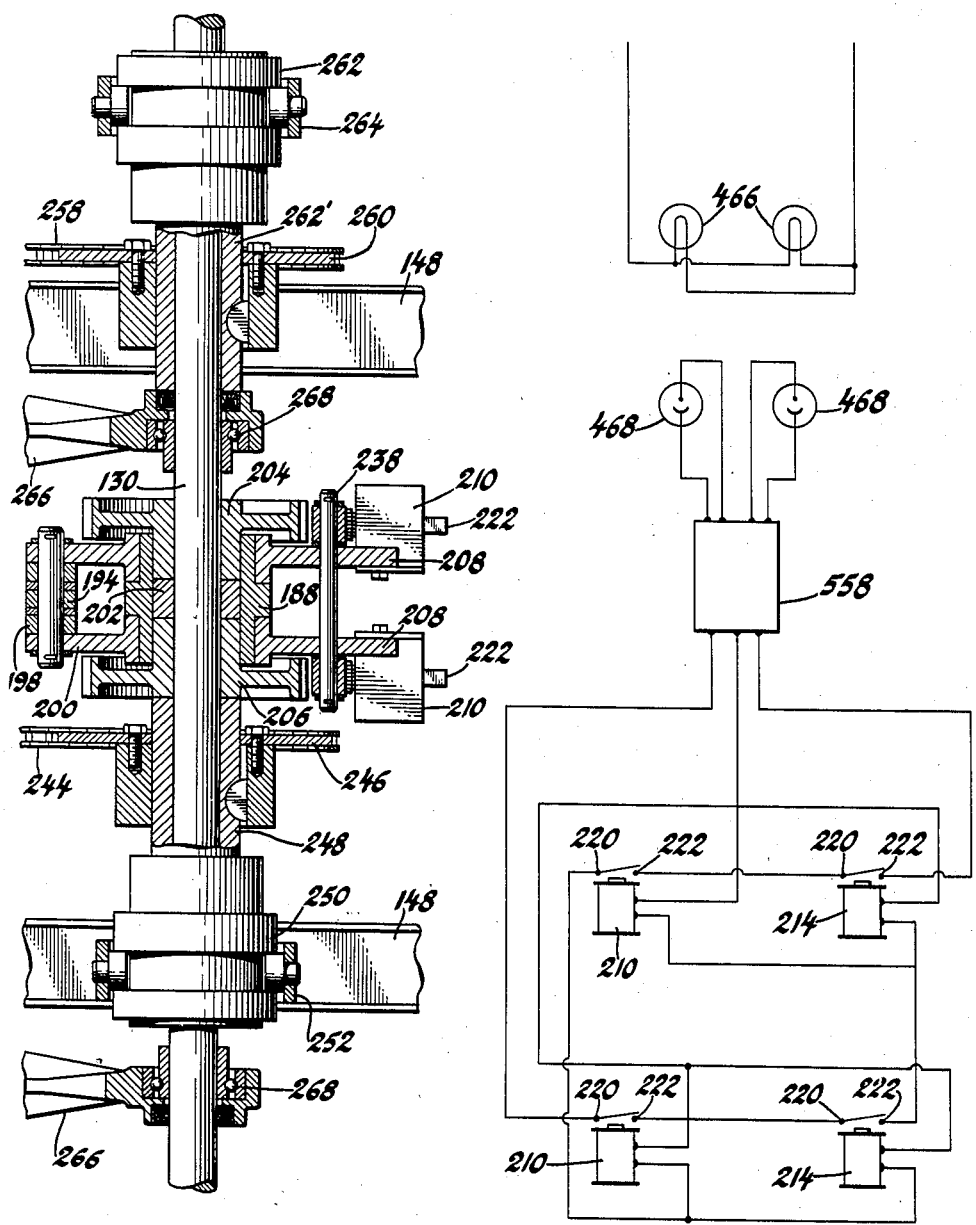
Figure 10 is a detail sectional view taken on line 10—10 of Figure 7.
Figure 30 is a schematic wiring diagram of the electrical connections of the light control for the longitudinal drive device.

Referring now more specifically to Figure 10, the mounting of the various parts upon the shaft 30 can be more clearly seen. The shaft 130 extends entirely across the end of the machine and adjacent its center portion carries a spacing block 202. Adjacent each end of the block 202 is rigidly mounted a toothed wheel 204 and 206, the teeth on wheel 204 being inclined in the opposite direction to those on the wheel 206, the purpose of the latter being to drive the shaft in opposite directions under differing conditions. The hub portions of the two toothed wheels are extended toward each other and in combination with the block 202 form a bearing for the lower portion of the member 188 which forms the support for the reciprocating housing 184. This housing may be relatively movable with respect to the toothed wheels.

Mounted in turn on the outer surface of the member 188 where it encircles the shaft are two spaced members 200 which as before mentioned are connected to the members 198 and are reciprocated up and down by movement of the housing 184 as driven from the eccentric. This causes the member 200 to rotate around the outer surface of the members encircling the shaft and carried by the opposite ends 208 of the members 200 from that connected to the members 198 are a pair of magnetic relays 210 the purpose of which will become obvious as the specification proceeds.

Mounted on the housing 184 above the toothed wheels 204 and 206 are two angular brackets 212 which support two more electromagnets 214 similar to 210. Each of these magnets 210 and 214 has an electromagnet armature 216 in the form of a T, the long leg portion of which extends through the heart of the magnet and to the lower end of the T is connected an electrically insulated cross member 218 carrying a pair of contacts 220 which are adapted to engage with spaced contacts 222 carried by the frame of the electromagnet. Mechanically connected to the head of the T armature is a short link 224 which is supported and spring biased to outer position by a leaf spring 226 supported on an arm 228 fastened by any suitable means to the outer casing of the electromagnet. On the link between its ends are a pair of pins 230 between which extend a short member 232 which is pivoted in the member 228 and spring biased to outer position by spring 234. It is thus evident that as the electromagnet is energized the lever 224 will be pulled in toward the magnet which will pull in the member 232 and rotate it about its pivot in the plate 228. Adjacent the opposite end of each of these members 232 is a pawl 236 which is pivoted on a cross shaft 238 and each pawl lies adjacent the surface of one of the toothed wheels 204 and 206. The portion of the pawl adjacent the lever is divided to form a groove 240 for the end of the member 232 which rocks therein and thereby its oscillation causes the pawl 236 associated therewith to engage or disengage the proximate tooth of the gear 204 or 206.

It will be noted that one relay 210 and 214 is associated with each of the toothed wheels 204 and 206, one being adjacent the top of the wheel and the other slightly to one side. The purpose of these pawls is to engage one or the other wheel to drive the same from the reciprocated motion of the housing 184 or the cross lever 200 to cause the shaft 130 to turn in the desired direction and drive the movable box frame to feed the cutter with regard to the desired direction as controlled by the follower or tracing member so that if one set of pawls 236 is in engagement the shaft will be rotated in one direction, while if the other pair are in engagement the shaft 130 will be rotated in the opposite direction. The purpose of the double pawl on the toothed drive is to increase the speed of operation, for when one of the pawls is in engagement the other will be ratcheted to obtain a new hold for feeding and vice versa. This operation will be evident from the linkage connection as shown. At the same time that the relays operate mechanically to cause the pawls to engage or disengage, they also close a set of contacts, the purpose of which will be described later with respect to the circuit diagram.

It will thus be seen that with this construction the shaft 130 may be rotated in either direction depending on the control. This drive of course is very slight and moves the movable frame only a very minute distance. If it is desired for some reason or other to move the movable frame rapidly from one position to another, a gear 242 is keyed to the rotatable stub shaft 172 and drives through a chain 244, a gear 246 which is keyed to a sleeve 248, the sleeve being rotatable upon the shaft 130. The sleeve member drives one portion of a clutch 250 which when operated into engagement with the other portion rigidly secured to the shaft 130 causes a direct drive from the stub shaft 172 to the shaft 130. The clutch is operated by a hand lever 252 and is normally kept in inoperative position by a suitable spring bias. This of course only operates the shaft 130 in one direction and a similar drive from the gear box 158 through gear 256, chain drive 258 and gear 260 keyed to a second sleeve 262' and rotatable on the shaft which also drives through a similar clutch 262 operated by a hand lever 264, will drive the shaft 130 in the opposite direction for rapid travel. The shaft 130 is further supported on brackets 266 which extend outwardly from the vertical base of the shelf and carry therein ball bearing assemblies 268 to insure free rotation of the shaft.

The apparatus so far described therefore discloses a stationary and a movable box frame and means for longitudinally moving the movable frame within the stationary to any desired extent. The drive for moving this movable frame is controlled by follower mechanism, designated generally at 270, which follower mechanism is adapted to trace the surface of a model such as 4. The apparatus for moving the tracing mechanism and by which the tracing mechanism controls the drive will now be described.

Across the left hand end of the movable frame as viewed in Figure 4, extends an upper and lower rod 272 and 274. These rods are supported at one end in suitable bearings 276 and are driven at the opposite end in a manner to be described from a source of energy 278 similar to the type of drive already specifically described for moving the frame longitudinally. This driving means 278 comprises a motor 280 driving a reducing worm gear box 282 and through the same type of drive as before described driving a longitudinally supported shaft 284. This longitudinal rod 284 drives the upper threaded rod 272 through suitable bevel gear connections, not shown, inside the elbow 286 which construction is substantially identical to that shown in Figure 6 for the drive of one of the lower horizontal threaded rods.

Figures 11, 12:
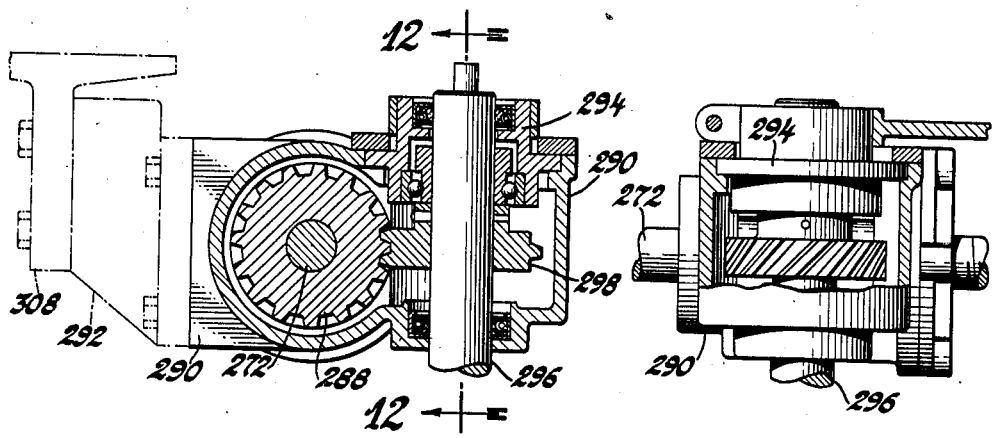
Figure 11 is an enlarged detail sectional view taken on line 11—11 of Figure 4.
Figure 12 is a detail sectional view taken on line 12—12 of Figure 11.
Figures 13, 14:
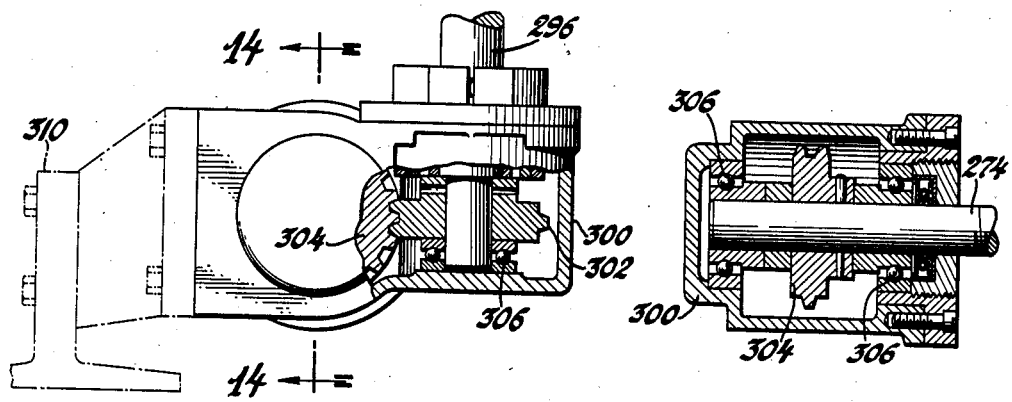
Figure 13 is a view similar to Figure 11 of the drive connection at the bottom partly in section, taken on line 13—13 of Figure 4.
Figure 14 is a sectional view taken on line 14—14 of Figure 13.

On the rod 272 (see Figure 11) near the driving end is secured a gear 288 within a housing 290 supported from the movable frame by a suitable bracket 292. This frame 290 also supports a lower bar assembly 294 for supporting the upper end of a vertical drive rod 296. Secured on the rod 296 is a worm wheel 298 which is adapted to mesh with the gear 288 and therefore receive its drive from the shaft 272. The lower end of the shaft is journalled in a suitable support 300 and has secured thereto a worm wheel 302.

Also supported within the member 300 is one end of the lower threaded rod 274 which carries thereon a gear 304 which meshes with the worm wheel 302 in order to provide a drive from the vertical shaft 296 through to the horizontal threaded rod 274. Both the vertical shaft 296 and the horizontal rod 274 are provided with suitable ball bearing assemblies 306 for frictionless support. It will thus be evident that as the main drive shaft 284 rotates, that the two upper and lower threaded rods 272 and 274 will rotate therewith and in synchronism to drive the follower mechanism laterally across the movable carriage.

Extending across the upper portion of the movable carriage adjacent the upper threaded rod 272 is a T beam 308 which acts as a guide rail for the upper portion of a support carrying the follower mechanism. Directly below the T beam 308 and across the bottom of the movable carriage is a second T beam 310 connected at both ends to the carriage, said lower beam being inverted and also acting as a roller track for the supporting mechanism. Extending between these two T beams is a vertical hollow shaft 312 which is adapted to support at some point between its ends, and as shown substantially near the center, the follower mechanism 270. This vertical rod is driven back and forth laterally across the end of the carriage by the two screws 272 and 274 and is guided and supported on the two trackways provided by the beams 308 and 310.

To the upper end of the hollow shaft 312 is secured a collar member 314 of substantially rectangular shape and having a hollow center. Within this center portion are provided two extending bosses 316 which are hollow and support therein stub shafts 318 which carry adjacent the upper end a ball bearing assembly 320, the outer race 322 of which acts as a roller. These two rollers are spaced apart a sufficient distance to allow the downwardly projecting portion of the T beam 308 to be supported therebetween and the outer rim of the member 314 is slotted as shown at 325 to admit this portion of the T beam therethrough. The lower end of one of the stub shafts is provided with a nut 324 and the shafts are enlarged at the upper end as shown at 326 to provide for assembly within the boss 316. The nut 324 may be tightened on the end of the shaft and still leave the shaft free to rotate within the boss. This is true of the right hand shaft which has an eccentric portion, the purpose of which will later be described. The left hand shaft merely has a cotter pin of suitable description for preventing its sliding from the boss.

Figure 17:
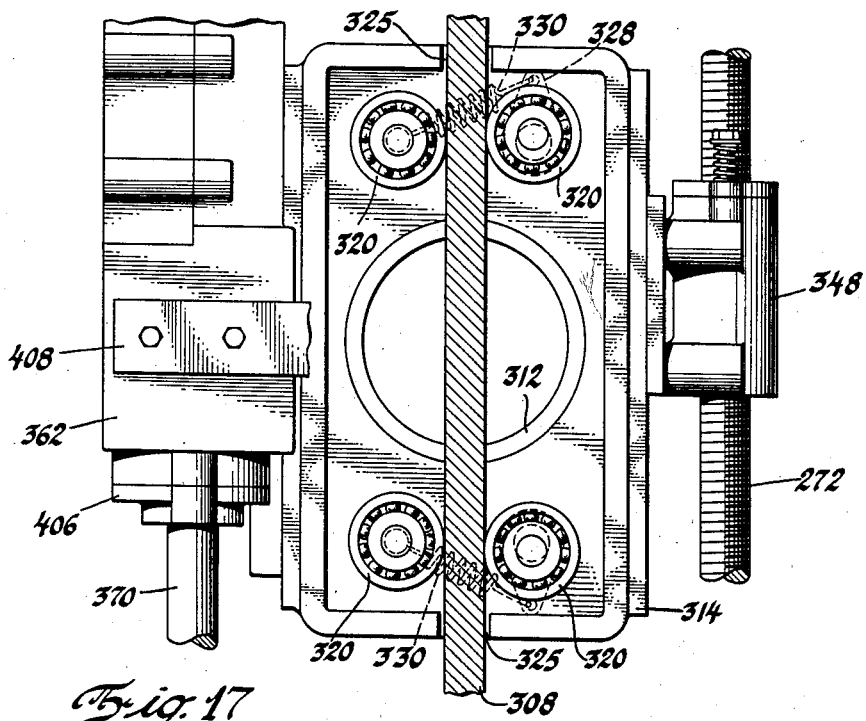
Figure 17 is a sectional view taken on line 17—17 of Figure 15.
Figure 18:
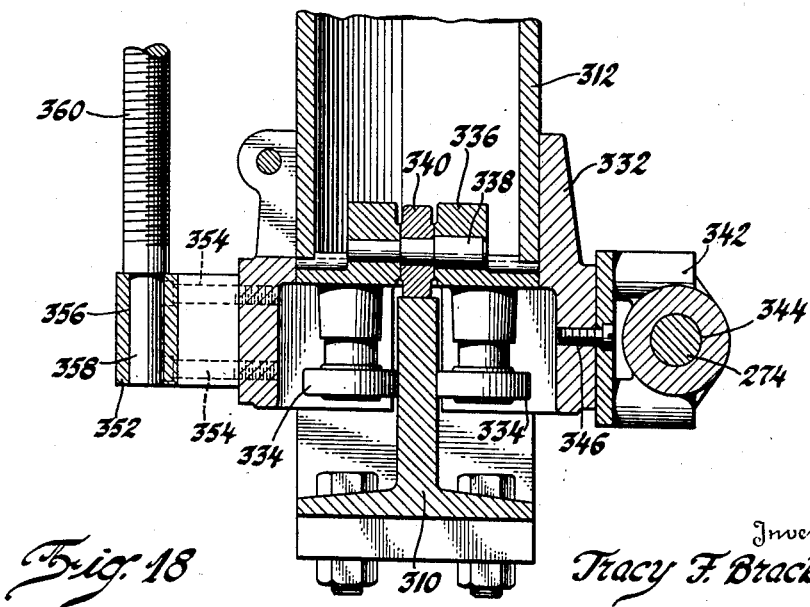
Figure 18 is an enlarged detail sectional view taken on line 18—18 of Figure 4.

As best shown in Figure 17, there are two pairs of these stub shaft roller assemblies, one on either side of the axis of the shaft 312 and within the collar 314. The stub shaft to the left, as viewed in either Figure 15 or Figure 17, has the roller mounted concentrically therewith but in the case of the right hand rollers these are mounted eccentrically with regard to the axis of the stub shaft as shown by the dotted lines. These have secured thereto a projecting arm 328 to which is secured one end of a spring 330, the opposite end of which is anchored to the complementary shaft so that under spring tension the right hand roller is spring biased against the side of the T beam to afford sufficient pressure to clamp the T beam between the two rollers to provide smooth movement of the collar housing and its associated shaft 312 on the T beam guide. The lower end of the hollow shaft 312 has secured thereto a similar collar 332 in which are suitably supported a pair of rollers 334 on opposite sides of the upwardly projecting portion of the T beam 310 whose construction is substantially the same as that utilized in the upper assembly for guiding the movable shaft 312 on the lower T beam guide.

Within the open end of the shaft 312 there is provided a pair of opposed spaced bosses 336 through which extends a pin 338 and on the pin between the bosses is rotatably supported a roller 340 which is adapted to ride upon the projecting end portion of the T beam and provides the vertical support for the shaft 312. It is thus evident that these various roller assemblies provide vertical and lateral non-friction support for moving the shaft 312 laterally across the movable carriage.

Secured to one side of the collar 332 in the lower assembly is a member 342 having a circular opening 344 through which is internally threaded the rod 274. This member 342 is suitably secured to the collar by studs 346. It is thus evident that if the threaded rod 274 is rotated that it will force the member 342 back and forth due to the threaded action and of course this carries with it the lower assembly and one end of the shaft 312.

To the upper collar 314 is also secured a similar drive member 348 which has an opening 350 therein also internally threaded and adapted to have the upper drive rod 272 passed therethrough in threaded relationship so that as this rod is rotated the member 348 and the upper end of the shaft 312 will be moved. It will thus be seen that with this construction and the synchronous drive for the two shafts 272 and 274 that hollow shaft 312 will be moved back and forth across the end of the movable carriage as the drive motor 280 is energized.

Secured to the opposite side of collar 332 from the drive shaft 274 is a bracket 352 by suitable screws 354, said bracket having a vertical cylindrical opening 356 therein which encloses and supports the lower reduced end 358 of a threaded vertical rod 360 which is rotatable therein.

A housing 362 is also bolted to the upper collar member 314 directly above the bracket 352 into which the upper end of the threaded rod 360 projects. The lower portion of the housing 362 has a cylindrical bearing opening therein in which the upper end of the rod is journalled and this sleeve portion is then provided with a larger aperture which encircles a bevel gear 364 which is held to the upper end of the rod by pin 366, a lower bearing assembly 368 being provided between the lower surface of the bevel gear and the inner surface of the casing.

Passing through the upper portion of the casing over the upper end of the rod 360 is a horizontal shaft 370, one end of which is journalled in a bracket 372 also supported on the T beam 308. The opposite end of the rod extends to a gear box 374 (see Figure 2) which is identical with the bevel gear box 136 formerly described and best shown in Figure 6. There it receives a drive from a longitudinal shaft 376 which is driven by another driving unit 378 identical with those formerly described and consisting of a drive member 380 and a reducing gear box 382 which drives a shaft and then through a series of either chains 384 or ratchet drive 386 drives the shaft 376. The shaft 376 extends beyond the drive unit and meshes in a further bevel gear box 388 with a suitable drive for a transverse shaft 390 which lies parallel to the shaft 370 and rotates in synchronism therewith. This shaft 370 (see Figure 16) as before mentioned passes through the upper portion of the housing 362 and carries thereon a bevel gear 392 rigidly secured to a circular member 394, the latter having secured to one portion thereof a key 396 slidable in a longitudinal slot 398 in the shaft 370, said slot 398 extending for the full length of the shaft.

Secured in the end of the housing 362 adjacent the circular member 394 is threaded a plug 400 which maintains the ball bearing assembly 402 firmly against the end of the member 394 to allow the member 394 to rotate with relation to the housing and reduce the friction thereby. The opening in the opposite end of the housing 362 through which the other portion of the shaft 370 projects is also enlarged and carries a ball bearing assembly 404 which is held within the casing by a notch and a screw plate 406 held securely to the side of the housing. It will thus be evident that as the shaft 370 rotates, even though the housing is carried therealong, that the bevel gear 392 will be rotated at all times therewith and will drive the vertical threaded rod 360, the purpose of this drive being to raise and lower in a vertical plane the follower or tracing unit 270.

Secured to the top of the housing 362 there is bolted an arm 408 which is adapted to contact control members 410 of limit switches 412 located on opposite ends on top of the beam 308. These are provided so that the device will not operate in transverse travel beyond a certain point.

Vertically movable upon the hollow shaft 312 is a sleeve 414 formed of a cylindrical member split adjacent each end, said split having a bolt 416 extending therethrough as well as an adjustable screw 418 for purposes of adjustment so that the sleeve will fit snugly but not bind on the shaft. In the outer surface of the sleeve on one side is formed a keyway 420 and on the inner surface of the sleeve is formed a projected key 422 slidable in the keyway to keep the sleeve from rotating on the shaft. Extending to the rear is an extension 424 secured to the rear face of the sleeve by suitable bolts 426 and through the center of which is provided a threaded opening 428 through which is adapted to pass the vertical threaded rod 360. Since the extension 424 is integral with the sleeve any turning of the rod 360 will force the member 424 and the sleeve up or down on the vertically stationary rod, depending on the direction of rotation. One end of the threaded opening 428 in the member 424 is counterbored as shown at 430 to larger diameter and a bushing member 432 internally threaded and having the same outside diameter as the remainder of the bore is adapted to fit therein. Two bolts 434 are provided which pass through the outer flange and are threaded into the member 424, said bolts having a long shank which is surrounded by helical springs 436 to spring bias the member 432 into the opening. In this manner the backlash between the threads and the vertical rod 360 and the threaded member 424 will be eliminated.

A boss 438 extends to one side of the sleeve member 414 and carries a hollow shaft 440, one end of which supports photo-cell amplifiers 442. Also supported from a bracket 444 carried by the forward end of the hollow tube is a supporting arm 446 for the mechanical follower which in this case is composed of a horizontally slidable rod 448 having thereon a rotatable wheel 450, the wheel being adapted to travel over the surface of the model and the irregularities therein cause the rod 448 to move back and forth in the sleeve 452, the inner end of the rod lying adjacent one end of a bell crank lever 454 which is pivoted on a portion of the support 446. The other arm of the bell crank is adapted to force one end of a rod 456 longitudinally which action operates a shutter 458 which has an opening 460 as shown in Figure 21.

Also supported by suitable means from the main sleeve 414 is a bracket 462 which supports a housing 464 in which are located a plurality of light sources 466 and in a spaced covered portion a plurality of photo-sensitive cells 468. Between the two shells which enclose these sources of light and photo-sensitive elements there is provided a short sleeve-like aperture 470 through which light may pass from one source to its associated cell and rotatably supported adjacent this opening is the shutter mechanism 458 previously mentioned. The shutter is so designed that when the rod 456 is moved in one direction from what may be termed neutral, an opening in the shutter allows light to pass to one of the photo-electric cells which through itself and those amplifiers located at 442 will allow current to flow to energize one pair of relays on the longitudinal driving means so that the carriage will be moved. If, however, the follower takes such motion that the rod 456 is moved in the opposite direction, the other light aperture will be opened by the shutter and the opposite photo-electric cell will allow energization of the other two relays and move the movable frame in the opposite direction. Suitable cables 472 are of course provided for connecting the light source and the photo-cells to their amplifiers and the source of current.

As before mentioned, rotation of the shaft 376 causes synchronous rotation of the shaft 390 spaced from and parallel to the shaft 370 and extending across to a movable frame at the opposite end. Also located at approximately the same location are two horizontal threaded shafts 474 and 476 which are identical to the two shafts 272 and 274 on the opposite end and whose function is to drive the upper and lower ends of a vertical shaft 478 which is mounted in identical fashion with the vertical shaft 312 on the first described end. The shafts 474 and 476 are driven from the same unit 278 which drives the shafts 272 and 274 through suitable shafting 478' and 504 so that as the vertical shaft 312 moves transversely across the frame the vertical shaft 478 will move in synchronism therewith and at exactly the same speed. Surrounding the vertical shaft 478 is a slidable sleeve member 480 which carries thereon a suitable supporting arm 482 which is adapted to support a cutter mechanism 484. The shaft 390 drives through an identical drive to a vertical threaded rod 485 which is exactly the same as the vertical feed rod 360 associated with the vertical shaft 312 whose function of course is to feed the cutter in a vertical plane.

Also provided on the movable frame are suitable clamping means 486 for supporting a work-piece 488 adjacent the cutter so that that may be engaged and the same surface cut in the work-piece as that over which the follower travels on the model. It is of course evident that if the cutter is turned one way so that its travel is identical with that of the follower, that the same type surface will be cut such as shown by dotted line 490, but if the cutter is turned around 180° to a position opposite to that of the follower member, a complementary surface such as that shown in dotted line 492 will result. It is thus evident that either the same or complementary surface may be reproduced by this machine.

As shown in this construction, the follower head is fixed in a horizontal plane and is adapted to travel transversely across the side of the model and will reproduce the surface thus engaged, the control head in this case operating the drive units 154 which controls longitudinal movement of the movable frame. If it is desired to scan the model vertically, the drive 378 will be utilized to give a constant speed feed in a vertical plane and the control head will operate the same drive 154 to follow the horizontal displacement.

Briefly referring to the connections between the control head and the longitudinal drive member to which it is attached, each of the control photocells is adapted to control one pair of relays on one of the drive ratchets for driving the machine in one direction. Thus if one photo-cell is energized it will energize a pair of electromagnets 210 and 214 which will catch the teeth on one of the drive wheels and turn the shaft 130 in one direction. If the movable frame has moved far enough so that the follower wheel 450 no longer contacts the surface, the shutter will cut off light from that photo-cell and if there is no over-travel both photo-cells will remain dark and the movable carriage longitudinally stationary. However, if the machine has over-traveled, the other photo-cell will immediately become energized and the opposite set of relays will throw in their ratchets to feed the carriage back again to the neutral position. This condition is repeated until the whole surface has been scanned so that actually the machine operation is that of one following a line and going slightly to either side in order to correct for any travel in that direction. All of the long shafts instead of being made in one piece are provided with suitable couplings 494 at various points so that if it is necessary to remove a portion of the apparatus for repair, it will not be necessary to take out all of the shafting for that purpose.

In the drive between unit 278 and the horizontal threaded rods 474 and 476, there is provided a reversing clutch mechanism 496. The shaft 478' is carried along the side of the frame and is connected by pin 498 to two bars 500 lying on opposite sides of the shaft 478', said bars being retained in position by an H-shaped member 501 to the opposite sides of which are secured plates 502. The H-shaped member 501 and the bars extend beyond the end of the shaft 478' and an opening is provided through the center of the H-shaped member to accommodate an end of a shaft 504 which abuts the end of the shaft 478', said shaft 504 being pinned by pin 506 in the H-shaped member so that the same will move longitudinally with the shaft 504. It will thus be seen that as one shaft, namely 504, moves longitudinally with respect to the shaft 478', that the H-shaped member and the two oppositely disposed bars will form extension guides so that the joint may be operated to a certain degree to provide a certain end travel in the driving shaft 504.

Adjacent this slidable connection is a bearing housing 508 connected to the frame by arm 510 which supports in a cylindrical opening 512 therein a longitudinally movable block 514 which acts as a sleeve bearing for the stub shaft 504. On the shaft 504 adjacent this block is carried a bevel gear 516 which is pinned to the shaft by a pin 518. Between the bevel gear and the longitudinally slidable block 514 is provided a roller bearing assembly 520 to provide a suitable friction reducing surface between the rotatably stationary block 514 and the rotatable bevel gear 516.

The housing 508 is enlarged beyond this point to include a large central opening 522 having a protruding extension 524 therein which carries one end of a transverse shaft 474 in a sleeve bearing 526. The inner end of the shaft 474 has rigidly secured thereto by a pin connection 528 a bevel gear 530 which is adapted under certain circumstances to mesh with the bevel gear 516.

On the opposite side of the housing 508 is duplicated the same type of design as that formerly described in having a hollow sleeve mounted to the frame at 532 and having therein a slidable bearing block 534 supporting the other end of the shaft 504. Adjacent the inner end of the block is carried a second spaced bevel gear 536 pinned to the shaft by pin 538 and having a ball bearing assembly 540 between the bevel gear and the slidable bearing block 534. The distances between the two faces of the spaced bevel gears 516 and 536 and the shaft 474 is greater than the diameter of the bevel gear 530 so that as the shaft 504 is moved longitudinally either one of the bevel gears may mesh therewith or both may be out of engagement.

Pivoted at 541 to the frame 508 below the extension 524 is a shifting lever 542 which is shown in its two positions by the full and dotted lines in Figure 23. Connected to the outer end of this movable arm is one end of a helical spring 544 the opposite end of which is connected by suitable anchor to the frame 508 at 546. Pivoted to the movable arm at approximately its center is a transverse lever 548 which extends to the outer end of the shaft 504 and lies substantially parallel to and below the same. At its outer end the lever carries an upwardly extending pin 550 which projects into the movable block 534 so that as the lever 542 is moved from one side to the other the force is transmitted through the longitudinal lever 548 to the block and thus to the shaft so that the shaft 504 is moved from a position in which the bevel gear 530 engages the gear 536 to a position in which the gear 516 engages the gear 530 and in this manner the direction of the drive on shaft 474 is reversed.

The vertical and horizontal feeds for the router 12 are provided in exactly the same way as those formerly described with relation to the follower mechanism so that they will not be described here and it will only be stated that the horizontal cross travel is provided by the two horizontal feed screws 474 and 476 as the vertical motion is provided by a vertical feed screw 485. In discussing this it is also well to point out that the form developed by the router may be either that of the same surface as that being followed by the follower mechanism 10 or it may be a complementary surface, depending upon whether the router is in one of two positions as shown in Figure 1. If it is in full line position the same surface will be reproduced as that being traced by the follower mechanism and if it is in the dotted line position the inside surface or complementary surface will be reproduced.

As well as having the inside, outside or complementary surface generated by the router when the follower passes over a surface, it may be desirable to cut the other outside or inside surface of the model. For example, if a car body is the model being used and the tracer head follows along one side, we reproduce this surface by having the router in its full line position (Figure 1). If it is desired to reproduce the inside surface the router is turned to the dotted line position, but if it is desired to make the inside or outside surface of the other half of the body, the same may be done from this same model surface by reversing the clutch mechanism 496. In this manner there may be produced from one side of the model a surface of either side, inside or outside.

The operation of the whole machine will now be described.

Any suitable model such as an automobile body or any other device which it is desired to reproduce is placed upon the rails 22 in one end of the frame and the tracing mechanism 10 is brought into proximity with the surface thereof, let us say at one end, and that it is desired to reproduce the side curve through horizontal travel. The mechanism 10 is rested against the surface and the motor mechanism 278 is started which would cause the tracer to follow a horizontal line around the side of the body. Suitable levers are provided for throwing the various drive devices in and out of operation. As the tracer follows the surface and the surface causes it to be pushed in one direction, one of the photo-cells 468 is energized, which through its relays and ratchets causes the drive mechanism 154 to turn the two lower longitudinal drive rods to move the movable frame in the desired direction. Thus if the body causes the follower arm 448 to move inwardly, the photo-cell will cause the movable carriage to be driven back so that the arm may again move out and merely keep in light contact with the surface. If the contour of the body causes the follower wheel 450 to move outwardly, the other photo-cell is energized and will cause the movable carriage to move back toward the surface. It is thus seen that this control keeps the follower roller always in light contact with the surface. This back and forth movement of the movable carriage carries with it the router or cutter which before the machine has been started has been placed adjacent some material which it may cut to reproduce the same surface and thus as the tracer moves across the original surface the contour through the movement of the movable carriage is controlled to follow and reproduce a similar surface. If it is desired to trace a vertical section across the model, rather than a horizontal line, instead of having the horizontal drive motor 278 operative, the vertical drive 378 may be utilized which will operate in exactly the same manner. It will thus be evident that with a contour taken at successive positions along the surface that it will be comparatively easy to reproduce a large area in a small amount of time as with present mechanism only a short time is required to trace the contour at one point.

The control circuit for carrying out the operation above outlined is shown diagrammatically in Figure 30 in which two sources of light 466 are shown as connected to any desired source of energy and which operate to provide illumination to control the photo-cell units 468 whose output is amplified by amplifiers 558 and the output of the amplifiers from either one of the cells is led to a pair of either one of the pairs of relays 210—214, the energizing circuit to either pair being controlled by the contacts 220—222 on the opposite set of relays, these contacts being shown best in Figure 7. Thus when one photo-cell is energized one pair of relays is energized to ratchet the drive device in one direction and vice versa.

I claim:

1. In a surface reproducing machine, a stationary base, uprights secured thereto, a member having the same outline as the base secured to the upper extremity of each upright and forming with the base a box-like structure, a plurality of rails carried by both upper and lower base members, a second box-like frame supported movably on the rails, means for driving the movable frame along the rails, a plurality of means extending across the stationary structure in spaced relation, a model and a blank adapted to be secured to the last-named cross means whereby both model and blank are totally enclosed within the structure, scanning and cutting means secured to the movable frame in juxtaposition to the model and blank respectively and means connecting the scanning means to the driving means whereby the movable frame may be driven to carry the cutter in response to the movement of the scanner and reproduce an equivalent surface.

2. In a surface reproducing machine, a box-like stationary frame, rails carried thereby, a second box-like frame mounted on and movable along said rails, means on the stationary frame for driving the movable frame in a plurality of directions, a model, a blank, means for supporting said model and said blank in spaced relation within the frames, a tracer and a cutter carried by the movable frame adjacent the model and blank respectively and means on the movable frame for moving the tracer and cutter simultaneously and dupliciously in a plurality of different directions to duplicate the surface.

3. In a surface reproducing machine, a box-like stationary frame, rails carried thereby, a second box-like frame mounted on and movable along said rails, means on the stationary frame for driving the movable frame in a plurality of directions, a model, a blank, means for supporting said model and said blank in spaced relation within the frames, a tracer and a cutter carried by the movable frame adjacent the model and blank respectively and means on the movable frame for moving the tracer and cutter simultaneously and dupliciously in a plurality of different directions to duplicate the surface, said directions being at right angles to each other.

4. In a surface reproducing machine, a stationary box-like frame, longitudinal rails carried by the frame, a second similarly shaped movable frame supported on the rails for movement thereover, means supported on the stationary frame for driving the movable frame in either direction, a tracer head mounted for both vertical and transverse movement on the movable frame, said tracer head connected to and controlling the first-named driving means, a model supported on the stationary frame adjacent the tracer head, a blank supported in spaced relation to the model upon the stationary frame and cutting means supported on the movable frame adjacent the blank for both vertical and transverse movement with respect to the movable frame to duplicate the movements of the tracer head and driving means carried by the movable frame for moving both the tracer head and the cutter simultaneously either vertically or transversely.

5. In a surface reproducing machine, a stationary box-like frame, longitudinal rails carried by the frame, a second similarly shaped movable frame supported on the rails for movement thereover, means supported on the stationary frame for driving the movable frame in either direction, a tracer head and a cutter mounted in spaced relation upon the movable carriage in such a manner that they may be moved either vertically or transversely of said carriage, driving means for simultaneously moving both the tracer head and the cutter either transversely or vertically, said last-named driving means being carried on the movable frame and means in the tracer head for controlling the longitudinal driving means and switching means for controlling the vertical and transverse drive.

6. In a surface reproducing machine, a plurality of substantially identical frames, one movable with respect to the other, a model and a blank rigidly secured to one frame, a tracer and a cutter head secured to the other frame, means for moving one frame with respect to the other and control means operated by the tracer head for controlling the drive means, said tracer head being mounted adjacent the model and the cutter adjacent the blank whereby as the tracer head proceeds over the model it will control through the drive means the position of the second frame and therefore the position of the cutter with respect to the blank.

7. In a surface reproducing machine, a plurality of hollow frame structures of substantially the same outline movable with respect to each other, drive means carried by one frame and connected to cause such relative motion, a plurality of spaced operating mechanisms carried by the other frame and adapted to be simultaneously moved with respect thereto and driving means carried by said second frame for alternatively moving said mechanism as desired.

8. In a surface reproducing machine, a plurality of hollow frame structures of substantially the same outline movable with respect to each other, drive means carried by one frame and connected to cause such relative motion, a plurality of spaced operating mechanisms carried by the other frame and adapted to be simultaneously moved with respect thereto and driving means carried by said second frame for alternatively moving said mechanism as desired, said mechanisms being a tracer head and a cutter, a model and a blank carried by the first-named frame in juxtaposition to the tracer and cutter respectively, control means associated with the tracer to operate the drive means on the first-named frame whereby relative motion between the two frames is controlled and switching means named by the second carried frame for feeding the tracer and cutter simultaneously through the drive means carried on the second frame as desired to reproduce a surface.

9. In a surface reproducing machine, a stationary box-like frame, spaced longitudinal rails carried on this frame, a second similarly shaped frame supported upon and movable on said rails, a motor supported on the stationary frame, a long threaded shaft connected to and driven by said motor, means on the second frame connected to the threaded shaft and adapted to be moved by the rotation thereof, a plurality of vertical spaced means carried by the movable frame, transverse threaded means also carried by the movable frame and connected to the vertical members to move them transversely, a plurality of vertical threaded means carried by the movable frame adjacent the vertical members, a tracer head carried on one of the vertical members and a cutter carried by the other, the vertical threaded means in each case engaging the cutter or the tracer to feed the same vertically on the vertical member as a guide whereby the tracer head and the cutter may be moved either vertically or transversely of the frame and driving means carried by the movable frame and connected to the vertical and transverse threaded means for causing rotation and travel of the head or cutter in these directions.

TRACY F. BRACKETT.

CERTIFICATE OF CORRECTION.

Patent No. 2,242,506.                                May 20, 1941.

TRACY F. BRACKETT.

It is hereby certified that error appears in the printed specification of the above numbered patent requiring correction as follows: Page 8, second column, line 69, claim 6, strike out the word "head" and insert the same after "tracer" in line 68, same claim; page 9, first column, line 31, claim 8, for "named by the second carried frame" read --carried by the second named frame--; and that the said Letters Patent should be read with this correction therein that the same may conform to the record of the case in the Patent Office.

Signed and sealed this 8th day of July, A. D. 1941.

(Seal)
Henry Van Arsdale,
Acting Commissioner of Patents.